J. C. HENDERSON.

Magazine Stove.

No. 2,459. Reissued Jan. 15, 1867.

Witnesses:

Charles D. Kellum

R. D. Rerlle

Inventor:

J. C. Henderson

N. PETERS, Photo-Lithographer, Washington, D. C.

United States Patent Office.

JOSEPH C. HENDERSON, OF ALBANY, NEW YORK.

*Letters Patent No.* 28,482, *dated May* 29, 1860; *reissue No.* 1,506, *dated June* 30, 1863; *reissue No.* 2,459, *dated January* 15, 1867.

IMPROVEMENT IN HEATING AND OTHER STOVES.

The Schedule referred to in these Letters Patent and making part of the same.

TO ALL WHOM IT MAY CONCERN:

Be it known that I, JOSEPH C. HENDERSON, of the city and county of Albany, have invented, made, and applied to use, certain new and useful Improvements in Stoves; and I do hereby declare that the following is a full, clear, and exact description of that part of my invention relating to parlor stoves or heaters, reference being hereby had to the annexed drawings, which form and make a part of this specification.

Like letters represent and refer to like or corresponding parts.

Figure 1:
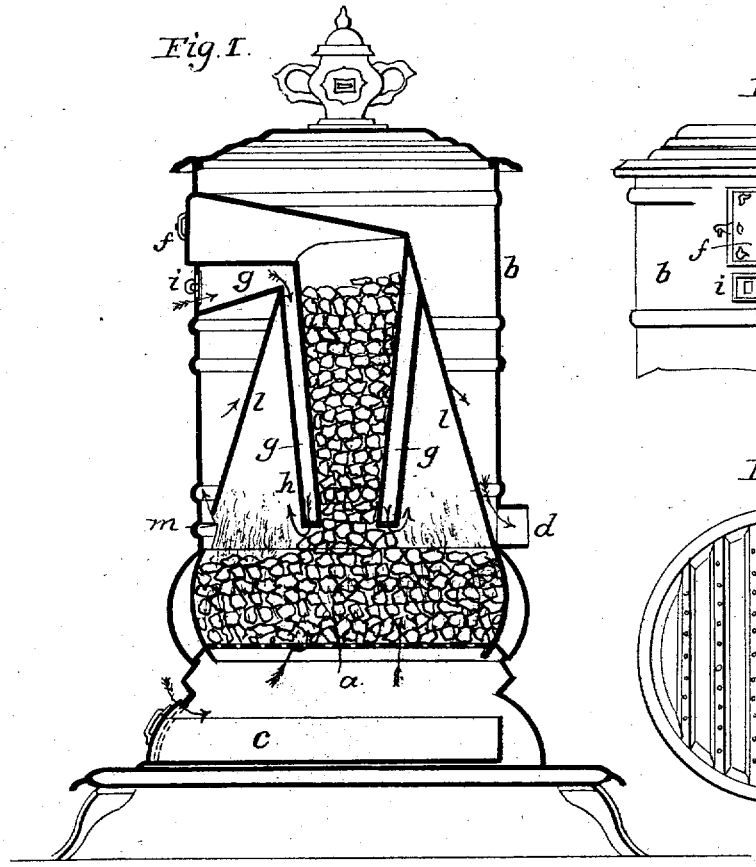
Figure 1 is a vertical section of my improved stove.
Figure 2:
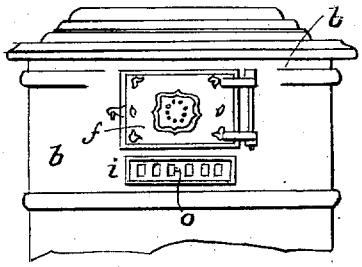
Figure 2 is a front elevation of a portion of the same.
Figure 3:
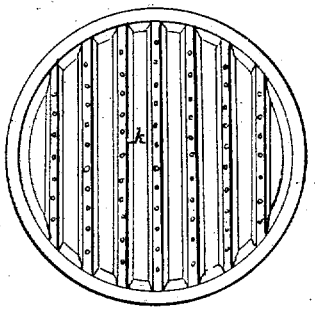
Figure 3 is a plan of the grate.

Several instances are known of, in which the fuel has been placed in a hopper or receptacle above the grate so as to supply the fire as the coal was consumed. Such a plan is particularly advantageous in preventing the fire being deadened by too much coal put on at one time, and also, as preventing the fire burning out too fast from lack of fuel. In all instances, however, with which I am acquainted, one of two difficulties or both arise, viz, the fuel ignites in the hopper or receptacle from the great heat and confined position, or else the gases passing off from the mass are not perfectly consumed, because they are not retained in contact with the heat of the fire to produce perfect combustion. The nature of my said invention consists in a hopper that is located above the fire-pot and supplies coal to the fire; and over the fire, and around the base of the hopper, a chamber is formed in which the gases are detained and subjected to sufficient heat to produce a perfect combustion; and I make use of a circulating current of air around the hopper to keep the fuel as cool as possible and prevent combustion in the hopper, and I introduce a current of air through the hollow lower edge of the hopper to effect the twofold operation of keeping the hopper cool and preventing it burning out at this point, and of supplying a hot blast to the fire at the surface of the incandescent fuel, to promote a perfect combustion of the gases evolved from the said fuel.

In the drawing, *a* is the fire-pot; *b* the casing or plates; *c* the ash-drawer; *d* the escape or smoke pipe; all of which may be of any desired size, shape, or character. *e* is a hopper, into which the fuel is placed; *f* is the supply door for the fuel; *g* is an air-space between said hopper and the fire terminating at the openings; *h h* and *i* is a register, to admit a regulated supply of air to the fire through said space. I have represented my hopper *e* as circular or conical, and directly over the centre of the grate *k*, but it will be evident that the shape of this hopper might vary, according to the character of stove. In all instances the air, in passing around the hopper, acts to keep the said fuel as cool as possible, and by carrying said air into the fire in a heated state, the combustion becomes more perfect, because said heated air comes directly in contact with the gaseous matters evolved from and rising above the fuel. The cone *l* is introduced around my hopper forming a combustion-chamber or horizontal flue, the object of this being to retain the gases in the presence of the fire heat and insure a perfect combustion similar to that set forth in my patent of May 18, 1858. By this mode of supplying fuel, I avoid many difficulties that arise, particularly with soft coal in stoves, wherein it has been found practically that a supply of fresh coal deadens the fire, the parts become cool, the gaseous matters thrown off, instead of inflaming, are in the form of smoke condensing on and becoming thick soot around the stove, and when these matters are thrown off and the fire commences to burn briskly, the stove is apt to be forgotten until the coal is almost consumed, and then a fresh supply repeats the difficulty; and with anthracite coal, the addition of considerable at one time is apt, on account of the heat acting on the whole mass, to evolve sulphurous fumes, which are detrimental to health, and all benefits from the same in combustion are lost. By the use of my feeder and air supply, all the foregoing difficulties are entirely removed and the fire kept constant and uniform with either soft or hard coal, and all loss of gaseous matter or obstruction to the stove is prevented, and the addition of large quantities of coal at one time does not dampen, check, or obstruct the fire. If the air-space *g* was dispensed with and fire-brick substituted, the operation of the parts would be analogous if air was admitted within the chamber above the fire from some other opening. It will be seen that my present invention is an improvement on that set forth in my patent of May 18, 1858.

Having thus described the nature of my said invention and improvements, what I claim as my invention, and desire to secure by Letters Patent of the United States, is—

1. A reservoir or hopper contracted at its lower end, to contain and supply fuel, in combination with a fire-pot separate from said reservoir, and to which the coal is supplied at or near its centre, so that the products of combustion pass away from the surface of the fire, around the contracted base of the said hopper, substantially as specified.

2. I claim a chamber or horizontal flue around the base of the reservoir or hopper supplying coal, and over the surface of the fire, to receive and detain the products of combustion, in contact with the fire heat until perfectly consumed, substantially as herein fully described and set forth.

3. I claim a contracted outlet or opening from the said chamber or horizontal flue, formed as aforesaid, to prevent a too rapid escape of the products of combustion, as specified and set forth fully hereinbefore.

4. I claim the surrounding case *b*, in combination with the said hopper, fire-pot, and chamber above the fire, for receiving the products of combustion from the said chamber and radiating heat, substantially as and for the purposes hereinbefore fully described and set forth.

5. I claim, in combination with a hopper over the fire, a circulating current of air surrounding such hopper, to aid in cooling the fuel in said hopper, substantially as hereinbefore fully described and set forth.

6. I claim the supply door *f*, and register *i*, in combination with the hopper *e*, and draught-space *g*, substantially as herein described and set forth.

7. I claim a circulating current of air passing through the hollow lower end of the supply hopper and entering the combustion-chamber over the fire, for promoting combustion and keeping the hopper from injury by heat, as described and set forth.

In testimony whereof I have on this 23d day of May, A. D. 1866, hereunto set my hand.

J. C. HENDERSON.

Witnesses:

CHARLES D. KELLUM,
R. H. REILLE.